US009251006B2

(12) United States Patent
Packer Ali et al.

(10) Patent No.: US 9,251,006 B2
(45) Date of Patent: Feb. 2, 2016

(54) APPARATUS, SYSTEM AND METHOD FOR AUTONOMOUS RECOVERY FROM FAILURES DURING SYSTEM CHARACTERIZATION ON AN ENVIRONMENT WITH RESTRICTED RESOURCES (71) Applicant: Qualcomm Incorporated, San Diego, CA (US)

(72) Inventors: Dhamim Packer Ali, San Diego, CA (US); Tom C. Wang, San Diego, CA (US); Sha Liu, San Diego, CA (US); Sreenivasulu Reddy Chalamcharla, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 147 days.

(21) Appl. No.: 14/139,704

(22) Filed: Dec. 23, 2013

(65) Prior Publication Data
US 2015/0149810 A1 May 28, 2015

Related U.S. Application Data (60) Provisional application No. 61/907,961, filed on Nov. 22, 2013.

(51) Int. Cl.
*G06F 11/00* (2006.01)
*G06F 11/14* (2006.01)
*G06F 11/22* (2006.01)

(52) U.S. Cl.
CPC ........ *G06F 11/1441* (2013.01); *G06F 11/1492* (2013.01); *G06F 11/2236* (2013.01)

(58) Field of Classification Search
CPC ....... G06F 1/26; G06F 1/3203; G06F 1/3293; G06F 9/4401
See application file for complete search history.

(56) References Cited

U.S. PATENT DOCUMENTS

| | | | |
|---|---|---|---|
| 6,513,113 B1 | 1/2003 | Kobayashi | |
| 6,839,792 B2 | 1/2005 | Feldstein et al. | |
| 7,237,145 B2 | 6/2007 | Sun et al. | |
| 8,214,675 B2 * | 7/2012 | Challener et al. | 713/324 |
| 2005/0097499 A1 | 5/2005 | Sun et al. | |
| 2007/0083491 A1 | 4/2007 | Walmsley et al. | |
| 2008/0086652 A1 * | 4/2008 | Krieger et al. | 713/330 |
| 2009/0074191 A1 * | 3/2009 | Gatto et al. | 380/277 |
| 2010/0268995 A1 * | 10/2010 | Goodman et al. | 714/45 |
| 2014/0136826 A1 * | 5/2014 | Paek | 713/1 |

* cited by examiner

*Primary Examiner* — Charles Ehne
(74) *Attorney, Agent, or Firm* — Smith Risley Tempel Santos LLC (57) ABSTRACT A power management mechanism maintains power to a processor and an integrated memory. Read-only logic and a cache are also provided. At power on, the read-only logic configures the cache as an internal memory and loads executable instructions in the cache. A copy of the executable instructions is stored in the internal memory. A branch instruction is also stored. Thereafter, the processor uses the copy of the executable instructions and present status information. The processor is programmed to issue a reset signal when a failure is detected. The read-only logic responds to the reset signal by going to the branch instruction in the internal memory, which directs the processor to use the copy of the executable instructions and status information in the internal memory circuit. The operating state is restored and the processor is instructed to execute the next instruction in the copy of executable instructions.

19 Claims, 6 Drawing Sheets

APPARATUS, SYSTEM AND METHOD FOR AUTONOMOUS RECOVERY FROM FAILURES DURING SYSTEM CHARACTERIZATION ON AN ENVIRONMENT WITH RESTRICTED RESOURCES

RELATED APPLICATIONS STATEMENT

This Application claims priority under 35 U.S.C. 119(e) and is a non-provisional of U.S. provisional Patent Application Ser. No. 61/907,961, entitled, "APPARATUS, SYSTEM AND METHOD FOR AUTONOMOUS RECOVERY FROM FAILURES DURING SYSTEM CHARACTERIZATION ON AN ENVIRONMENT WITH RESTRICTED RESOURCES," filed on Nov. 22, 2013 (Qualcomm Ref. No. 135185). The entire contents of which are hereby incorporated by reference.

DESCRIPTION OF THE RELATED ART

Computing devices are ubiquitous. Some computing devices are portable such as smartphones, tablets and laptop computers. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. As the functionality of such portable computing devices increases, the computing or processing power required and generally the data storage capacity to support such functionality also increases.

Some conventional designs for handheld portable computing devices include multiple processors and/or processors with multiple cores to support the various primary and peripheral functions desired for a particular computing device. Such designs often integrate analog, digital and radio-frequency circuits or functions on a single substrate and are commonly referred to as a system on a chip (SoC). Some of these highly integrated systems include a limited number of internal memory circuits to support the various processors. However, most SoC designs heavily rely on a significant amount of random access memory (RAM) capacity to operate satisfactorily. Generally, such RAM is provided via one or more standard double-data rate (DDR) memory circuits coupled to the SoC via a DDR compatible interface. In a conventional arrangement used in some portable computing devices, a SoC is enclosed in a package with both upward facing and downward facing connections. The downward facing connections of the SoC package are coupled via lower solder balls to a printed circuit board. The upward facing connections of the SoC package are coupled via upper solder balls to one or more memory buses, which are further coupled to NAND Flash or DDR RAM.

With the continuing industry trends towards smaller, faster, and higher power portable devices, power and thermal management are becoming increasingly important. Increases in device performance are directly related to higher temperatures, lower reliability, and decreased battery life if thermal considerations are not carefully considered. Not only are integrated circuits trending smaller but the boards and package assemblies in which they are deployed are also shrinking. Such closer integration tends to improve electrical performance and reduce system size and cost. These benefits are important; but from a thermal standpoint, further demands for improvements in portable computing device performance and functionality coupled with the desire to retain form factors that make these devices portable is a problematic combination. The continuous increases in power density have resulted in heightened industry focus on thermal and power management.

As a response, system engineers have developed test routines to characterize SoC and SoC based assemblies including systems with DDR memory across varying supply voltages and environmental conditions. These conventional routines rely on system resources that cannot be guaranteed to persist across unrecoverable system failures. Unfortunately, system failures frequently occur when supply voltages and operating temperatures are varied beyond the capabilities of the SoC or the SoC-based assembly under test.

Thus, there is a need for improved mechanisms for supplying routine commands to the device under test, guaranteeing system state persistence after recovery from a system failure and for recording system parameters across varying supply voltage and temperature.

SUMMARY OF THE DISCLOSURE

Example embodiments of systems and methods are disclosed that configure a computing device to execute a self-recovery executable algorithm. The computing device is arranged with a power management mechanism that maintains power to the processor and at least one internal memory circuit. The computing device is further arranged with integrated read-only logic and a cache. Upon applying power to the computing device, the read-only logic configures the cache as an internal memory for static data and loads the self-recovery executable in the cache. The computing device relocates a copy of the self-recovery executable in an internal memory circuit coupled to the processor and inserts a branch instruction at a defined location in the internal memory circuit. Thereafter, the computing device uses the copy of the self-recovery executable and present status information as the source for execution instructions. The self-recovery executable is arranged to issue a reset signal when a failure is detected. The read-only logic responds to the reset signal by going to the defined location in the internal memory circuit and using the stored branch instruction to return to the copy of the self-recovery algorithm in the internal memory circuit. Thereafter, the computing device restores the present state of the computing device and executes the next instruction in the copy.

An example embodiment includes a primary boot loader, a processor, a set of storage resources and an integrated power management mechanism that selectively responds to a computing device condition indicative of a system fault. The primary boot loader responds to at least two separate start conditions. The processor is coupled to and responsive to the primary boot loader. A first member of the set of storage resources is exhibited in a cache. The cache is configured to operate as if it were a static memory. A second member of the set of storage resources is exhibited in integrated circuits that share a circuit substrate with the processor.

An example embodiment of a method for autonomous recovery from system failures in a computing device with restricted capacity data storage resources includes the steps of arranging an integrated circuit with a selective power management mechanism, providing integrated read-only logic arranged to initialize the computing device, the read-only logic defining a cache storage element to function as an integrated memory element to store static information including executable logic received from an external source and a present device status, using the cache storage element to relocate a copy of the executable logic and the present device status to a first location in the internal memory element, using the cache storage element to insert information in a second location in the internal memory element, the information including the first location in the internal memory element and using the integrated read-only logic to detect a condition indicative of a failure and direct the processor to use the information in the second location in the internal memory element to jump to the first location in the internal memory element upon recovery from the failure.

Another example embodiment of a computing device includes one or more mechanisms for selectively initializing the computing device to receive executable logic from an external source, a first means for storing the executable logic, means for processing the executable logic, the executable logic including instructions that when executed by the processor, direct the processor to use a second means for storing, separate from the first means for storing the executable logic. The second means for storing receives a copy of the executable logic, read only and read and write operational results, and branch instructions to direct the processor to use the copy of the executable logic when a defined condition exists. The computing device is further configured with a mechanism for providing power to the processor and the second means for storing when a device fault occurs.

Another example embodiment is a non-transitory processor-readable medium having stored therein processor instructions and data that direct the processor to perform various functions including configuring a computing device responsive to one of a download mode of operation that receives processor executable logic from a source other than the computing device or an attempt to record parameters responsive to at least one variable test condition that resulted in an indication of a failure recorded on the computing device, executing the processor executable logic from the source other than the computing device, identifying a failure condition, upon recovering from the failure condition, restoring the processor executable logic and a state of the computing device when the failure is indicated and executing the next instruction from the processor executable logic.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

The present systems and methods provide a framework capable of configuring a PCD to load and execute software. If the PCD encounters failure conditions while executing the software, the PCD is configured such that at least one processor and an internal or integrated memory element coupled to the processor remain in a powered condition. A read-only memory (ROM) circuit sometimes known as a boot ROM also remains in a powered condition and includes the first code executed by the processor after a power-on (i.e., a cold boot) or upon a watchdog reset. The boot ROM includes a primary boot loader (PBL) that executes after a cold boot or after the detection of a reset signal. The PBL responds differently to cold boot and reset signals. After a cold boot, the PBL has the capability to direct the PCD to enter a download mode to receive an image that includes a set of executable instructions, relocate logic and insert logic via a transport layer such as the universal serial bus (USB). As will be explained in greater detail, when executed, the relocate logic copies the set of executable instructions and data from the cache to a first location in an internal or integrated memory (IMEM). Similarly, when executed, the insert logic places branch logic at a second location in the IMEM. The branch logic identifies the first location within the IMEM. After a watchdog reset, the PBL has the capability to directly access the second location in the IMEM whose memory contents are retained during the failure and detection of the reset signal and which direct the processor to execute from the copied version of processor instructions and present status as stored in the first location of the IMEM. The PBL has the further capability to respond to one or more input signals by executing an alternative or default boot execution path. This default boot execution path may include a set of processor instructions for loading an operating system and one or more applications for nominal operation of the PCD.

The set of executable instructions includes logic that directs the processor or processors to perform desired functions across different stages of a product assembly process to characterize the system. For example, the set of executable instructions may be configured to direct the processor to selectively apply power to and adjust the operational mode of various elements within or connected to a SoC. The various elements may include communication buses and integrated elements coupled to the processor via the communication buses. Thereafter, the set of executable instructions may attempt to execute a desired set of instructions through and or to these integrated elements under various system conditions. For example, the desired set of instructions may include attempts to read data from or write data to desired locations in a Flash-based memory element coupled to the processor via a memory controller and a communication bus. These operations may be repeated while operating one or both of the memory controller and the bus across various clock frequencies and voltages.

Such tests or operations often result in data errors and/or bus or memory controller failures. Under some conditions, the PCD may be able to programmatically recover from data errors. Upon detection, the error (and operating conditions) may be recorded, the data reset and the test algorithm continued to collect additional system characterization data. However, bus or memory controller failures may only be implied when the processor fails to receive an expected signal from one or both of the bus or the memory controller. These types of failures may be indicated by a counter that counts up or down to a desired value in response to a clock signal. The processor is arranged to respond to various signals by issuing a restart signal to the counter. If the counter reaches the desired value before it receives a restart signal from the processor, it is presumed that the system has failed. The processor, responds by issuing a system or watchdog reset.

As indicated above, the boot ROM detects the watchdog reset signal and uses the PBL to initialize those resources not protected by a permanent power condition. These resources include a cache, which is configured as a tightly-coupled memory. Such a tightly-coupled memory is a low-latency memory that can be relied on by the processor for critical routines such as interrupt handling or real-time tasks. An optional task that can be enabled by the PBL is an authentication of the self-recovery executable instructions. After the cache is configured and optional authentication is performed, the PBL in responding to the watchdog reset signal jumps to the internal or integrated memory whose memory contents are retained during the failure and detection of the watchdog reset signal. This first storage location includes logic which directs the processor to execute the self-recovery executable instructions stored at a separate defined location within the internal or integrated memory. Upon returning to the set of executable instructions from a watchdog reset signal, the processor is directed to restart execution at the next programmable step in the routine and to enable the circuit or circuits used to identify system failures.

Subsequent failures encountered while executing system on chip (SoC) characterization by adjusting one or more system settings, memory controller parameters, bus voltages and clock frequencies, etc., or while executing one or more other applications or algorithms, results in a retracing of the boot path from the PBL to the branch instructions located in the internal memory whose contents are protected during the watchdog reset and reconfiguration of the SoC. The branch instructions direct the processor to reenable the circuit or circuits used to identify system failures (e.g., a watchdog timer), increment to the next executable instruction and/or adjust one or more operating parameters before directing the processor to continue execution of the set of executable instructions.

Although described with particular reference to operation within a PCD, the described systems and methods are applicable to any computing system with a limited internal memory where it may be useful to autonomously recover from system failures. Stated another way, the computing systems and methods disclosed herein are applicable to desktop computers, server computers or any electronic device with a limited internal memory capacity.

Figure 1:
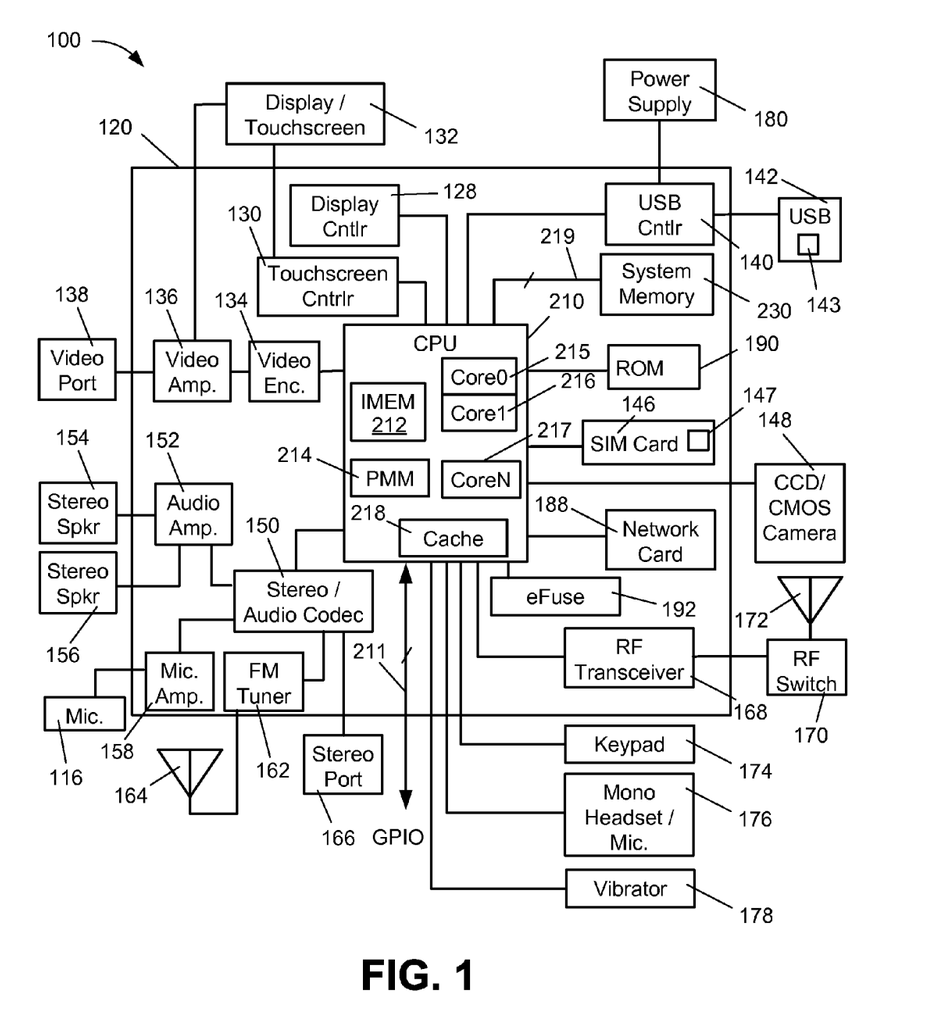
FIG. 1 is a schematic diagram illustrating an example embodiment of a computing device arranged as a SoC.

Reference is now directed to the illustrated examples. Referring initially to FIG. 1, an exemplary, non-limiting aspect of a portable computing device (PCD) is shown and is generally designated 100. As shown, the PCD 100 includes an on-chip system 120 that includes a multicore CPU 210. The multicore CPU 210 includes a zero$^{th}$ core 215, a 1$^{st}$ or first core 216, and an N$^{th}$ core 217. Each of the N cores are independent from each other and arranged to process instructions such as add, move data, branch, etc. The multicore CPU 210 is coupled to a general-purpose input output (GPIO) bus 211, and is arranged to include at least one internal memory or IMEM 212, a power management mechanism (PMM) 214 and a cache 218. Each of the N cores operates in conjunction with signals communicated on the GPIO bus 211 or from an eFuse element 192. The eFuse element 192 may contain a set of separate eFuses or circuit elements that can be selectively modified to open a circuit. The present voltage or a subsequent change in voltage can be observed to indicate a digital bit. A set of such bits can be used to adjust various behaviors across one or more of the N cores. In addition, one or more of the N cores executes processor instructions stored in one or more of the IMEM 212 and the cache 218. The PMM 214 is arranged to maintain power to at least the CPU 210 and the IMEM 212 during a reset after a system failure to enable autonomous recovery from such failure conditions during system characterization or when operating in accordance with similarly configured applications using limited data storage resources.

The GPIO bus 211 may be configured to send signals from the CPU 210 to any peripheral devices external to the on-chip system 120 or conversely to receive signals from any devices external to the on-ship system 120. Such peripheral devices may include one or more of those illustrated in FIG. 1 or in some cases devices not shown in FIG. 1. As will be explained, the GPIO bus 211 may be used to direct the on-chip system 120 to enter and operate in a desired mode of operation where executable processor instructions are downloaded from a storage device coupled to the on-chip system 120. The eFuse element 192 can also be used to the GPIO bus 211 to direct the on-ship system 120 to operate in various operational modes.

The IMEM 212 is an internal (integrated) memory element capable of storing data that may be retrieved by any of the N cores at a desired time as determined by the respective cores. The IMEM 212 is configured to provide a set of storage locations that are designated for respective cores. So arranged, the IMEM 212 provides an optimal memory performance for data desired by each of the N cores of the CPU 210.

The PMM 214 is an internal integrated circuit structure that maintains power to at least a portion of the IMEM 212 and one or more of the N cores of the CPU 210 during a watchdog reset condition. In this way the data stored in the IMEM 212 and the present operational state of the one or more cores can be maintained while other resources are reset or reconfigured after removing power.

The cache 218 is a data storage element that can be accessed by each of the N cores to reduce the average time to accessory information stored in a memory. The cache 218 has a smaller storage capacity than that provided by the system memory 230, the SIM card 146, and or the USB storage device 142, which are accessible to the CPU 210. As is known, the contents of frequently used memory locations from one or more of these other storage locations may be moved to the cache 218 to reduce the average latency of memory accesses for the on-chip system 120. In the present system, the cache 218 is configured to operate as a tightly-coupled memory for the storage of processor instructions, status information and vector or branch logic.

The read-only memory (ROM) 190 is an integrated circuit that includes the code or codes that are executed by the CPU 210 during an initial power-on or upon a watchdog reset condition. The ROM 190 includes a primary boot loader (PBL) that identifies whether the PCD 100 is functioning from a cold boot from a power off condition or a in response to a watchdog reset signal. During a cold boot, the PBL includes logic that enables the on-chip system 120 to enter a download mode of operation to receive a set of executable instructions via a transport mechanism such as that provided by the USB controller 140. In this way, a program or programs 143 within USB storage device 142 can be controllably retrieved and executed by one or more of the N cores on CPU 210. Alternatively, a program or programs 147 stored on a SIM card coupled within a SIM card interface 146 or a program or programs stored in a universal flash store (not shown) arranged on the on-chip system 120 can be controllably retrieved and executed on the CPU 210. In addition, when the ROM 190 determines that the on-chip system 120 is recovering from a watchdog reset signal, the PBL within the ROM 190 is arranged to jump into a specified location within the IMEM 212. As briefly explained, the contents of the IMEM 212 are retained during such a reset and can be used to direct the processor 210 to other portions of the IMEM 212 that can be used to reconfigure the on-ship system 120 in such a way that the program 143 or the program 147 can be continued absent intervention from external control signals or other mechanisms.

As illustrated in FIG. 1, a display controller 128 and a touch screen controller 130 are coupled to the multicore CPU 210. In turn, display/touchscreen 132, external to the on-chip system 120, is coupled to the display controller 128 and the touch screen controller 130.

FIG. 1 further indicates that a video encoder 134, e.g., a phase alternating line (PAL) encoder, a sequential couleur a memoire (SECAM) encoder, or a national television system(s) committee (NTSC) encoder, is coupled to the multicore CPU 210. Further, a video amplifier 136 is coupled to the video encoder 134 and the display/touchscreen 132. Also, a video port 138 is coupled to the video amplifier 136. As depicted in FIG. 1, a universal serial bus (USB) controller 140 is coupled to the multicore CPU 210. Also, a USB storage device 142 is coupled to the USB controller 140. A system memory 230 and a subscriber identity module (SIM) card interface 146 may also be coupled to the multicore CPU 210 with the connection 219 between the multicore CPU 210 and the system memory 230 consisting of two or more physical channels or paths for transferring data between these elements of the on-chip system 120. Further, as shown in FIG. 1, a digital camera 148 may be coupled to the multicore CPU 210. In an exemplary aspect, the digital camera 148 is a charge-coupled device (CCD) camera or a complementary metal-oxide semiconductor (CMOS) camera.

As illustrated in FIG. 1, a stereo audio CODEC 150 may be coupled to the multicore CPU 210. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 116 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, a stereo port 166 may be coupled to the stereo audio CODEC 150.

FIG. 1 also indicates that a radio frequency (RF) transceiver 168 is coupled to the multicore CPU 210. An RF switch 170 may be coupled to the RF transceiver 168 and an RF antenna 172. As shown in FIG. 1, a keypad 174 is coupled to the multicore CPU 210. Also, a mono headset with a microphone 176 may be coupled to the multicore CPU 210. Further, a vibrator device 178 may be coupled to the multicore CPU 210. FIG. 1 further shows that a power supply 180 may be coupled to the on-chip system 120 via the USB controller 140. In a particular aspect, the power supply 180 is a direct current (DC) power supply that provides power to the various components of the PCD 100 that require power. Further, in a particular aspect, the power supply 180 is a rechargeable DC battery or a DC power supply that is derived from an alternating current (AC) to DC transformer that is connected to an AC power source.

FIG. 1 further indicates that the PCD 100 may also include a network card 188 that may be used to access a data network, e.g., a local area network, a personal area network, or any other network. The network card 188 may be a Bluetooth network card, a WiFi network card, a personal area network (PAN) card, or any other network card well known in the art. Further, the network card 188 may be incorporated in an integrated circuit. That is, the network card 188 may be a full solution in a chip, and may not be a separate network card 188.

As depicted in FIG. 1, the display/touchscreen 132, the video port 138, the USB port 142, the camera 148, the first stereo speaker 154, the second stereo speaker 156, the microphone 116, the FM antenna 164, the stereo port 166, the RF switch 170, the RF antenna 172, the keypad 174, the mono headset 176, the vibrator 178, and the power supply 180 are external to the on-chip system 120.

RF transceiver 168, which may include one or more modems, supports one or more of global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE wireless protocols.

In the illustrated embodiment, a single instance of a multi-core CPU 210 is depicted. However, it should be understood that any number of similarly configured multi-core CPUs can be included to support the various peripheral devices and functions associated with the PCD 100. Alternatively, a single processor or multiple processors each having a single arithmetic logic unit or core could be deployed in a PCD 100 or other computing devices to support the various peripheral devices and functions associated with the PCD 100 as may be desired.

The illustrated embodiment shows a system memory 230 that is arranged within a fully integrated on-chip system 120. However, it should be understood that two or more vendor provided memory modules having a corresponding data storage capacity of M bytes may be arranged external to the on-chip system 120. When arranged external to the on-chip system 120, the various memory modules supporting the system memory 230 are coupled to the CPU 210 by way of a modified multiple channel memory bus (not shown) including suitable electrical connections for transferring data and power to the memory modules.

In a particular aspect, one or more of the method steps described herein may be enabled via a combination of data and processor instructions stored in the ROM 190. When configured with a PMM 214 that maintains power to the IMEM 212 and one or more of the N cores, the ROM 190 can be used to initially configure the on-chip system 120 to autonomously recover from failure conditions. As will be described in further detail below, the ROM 190, acting in conjunction with the IMEM 212 and one or more of the cores will configure a portion of the cache 218 to behave like a tightly-coupled memory. This can generally be accomplished by locking a few or all of the control inputs to the cache 218 or other SoC logic (not shown) so that the cache 218 behaves similar to a synchronous random access memory (SRAM). This portion of the cache 218 will receive the set of instructions from one or more external sources.

In addition to the described download mode, the primary boot loader (PBL) within the ROM 190 also has logic that indicates if one or both of the eFuse 192 or GPIObus 211 include information instructing the CPU 210 to boot from a flash media element (e.g., an embedded Multimedia card (eMMC), universal flash storage (UFS) flash boot and storage device in embedded systems) and if the CPU 210 either finds the flash media empty (as in a factory before provisioning) or the CPU 210 encounters an error loading or authenticating an image (data and executable instructions) from a flash-based store, the CPU 210 will enter a download mode as part of recovery management in the PBL. When such conditions are encountered, the CPU 210 is directed to enter a download mode to locate and transfer (e.g. copy) an image from an alternative source. The image contains the set of instructions and data. Data may include read-only data, read-write data, or a combination of read-only data and read-write data. After the image is copied into the cache 218, the CPU 210 uses the cache 218 rather than requesting information (e.g., executable instructions) from the system memory bus 219, the USB bus or the SIM card interface 146.

In some embodiments, the ROM 190 includes logic that enables an optional secure boot process. This secure boot process uses one or more mechanisms to authenticate the source of the processor instructions in the self-recovery algorithm being loaded from one of the sources available for communicating or transporting such instructions into the on-chip system 120. Once the set of instructions comprising the self-recovery algorithm are present in the cache 218, the instructions are relocated to a first location in the IMEM 212. In addition, the ROM 190 inserts branch logic at a second location in the IMEM 212 or another IMEM (not shown). The branch logic is used when the ROM 190 detects that the on-chip system 120 is operating after a watchdog reset condition. The branch or vector logic directs the processor 210 to the first location in the IMEM 212 where the copy of the instructions and data collected during the execution of the set of instructions is stored and remains persistent during the recovery from the watchdog reset condition.

Subsequent system failures that occur while executing the various instructions in the self-recovery algorithm across various system settings, memory controller parameters, bus voltage levels, clock frequencies, etc., result in a repeat of the boot path from the PBL (in the ROM 190) to the branch logic in the IMEM 212 and from the branch logic in IMEM 212 to the first location in the IMEM 212. Logic located in the first location in the IMEM 212 enables a reset of a timer or other monitoring mechanism that is used by the on-chip system 120 to identify system failures. The timer or other mechanism is initialized for the first time or reset before modifying the various system settings, memory controller parameters, voltages or frequencies while executing the processor instructions in the self-recovery algorithm.

Figure 2:
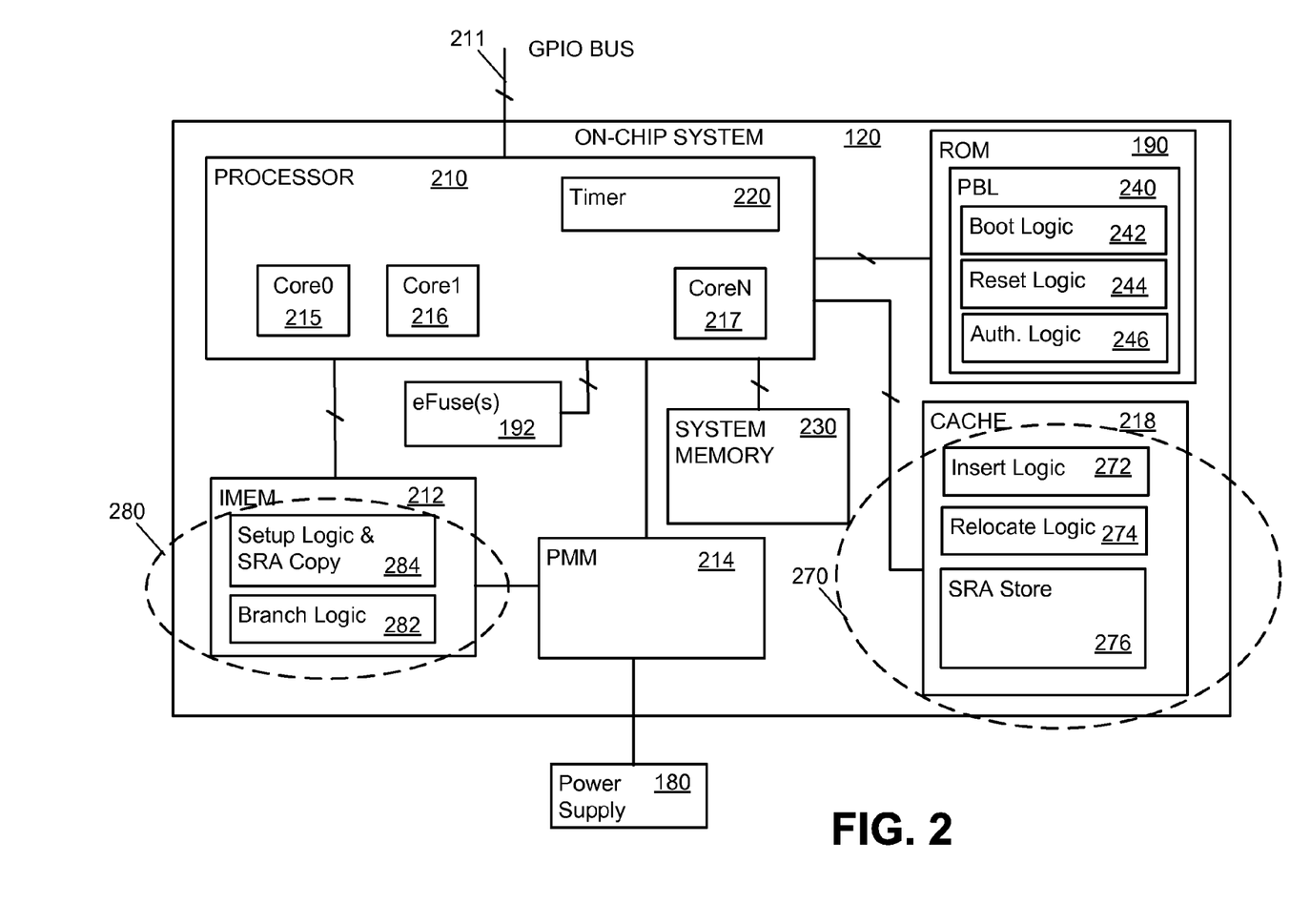
FIG. 2 is schematic diagram illustrating an example embodiment of the processor of FIG. 1.

FIG. 2 is schematic diagram illustrating an example embodiment showing further details of various components arranged in the on-ship system 120 of FIG. 1. As shown, the on-chip system 120 is coupled to a power supply 180 and a GPIO bus 211. As indicated, the power supply 180 may include a rechargeable DC battery or a DC voltage provided from an AC to DC converter.

The on-chip system 120 includes the ROM 190, multi-core processor 210, one or more internal or integrated memory elements (IMEM) 212, PMM 214, cache 218, eFuse(s) 192, and a system memory 230.

As briefly described, the processor 210 includes a timer 220, e.g., a watchdog timer, for identifying when one or more resources coupled to the processor 210 is non-responsive. Under such conditions the timer 220 will either count up to or down from a predetermined or programmable number. Once the timer 220 has completed the process of counting up or down, a system failure is assumed and the processor 210 sends one or more control signals to the PMM 214 and to the ROM 190. The PMM 214 is arranged with one or more control modules that selectively remove power from on-chip system resources other than the processor 210 and the IMEM 212 for a designated time before reapplying power to the system resources in a defined manner.

The processor is coupled to the ROM 190, which includes a PBL 240. The PBL 240 includes boot logic 242, reset logic 244 and optional authentication logic 246. The boot logic 242 is a circuit that initializes the processor 210, configures the cache 218 as a tightly-coupled memory and loads processor instructions defining a self-recovery algorithm into the cache 218. The reset logic 244 is a circuit that detects when the ROM 190 has been reset by a watchdog timer such as the timer 220. When the reset logic 244 determines that the ROM 190 is operating from a cold boot, the reset logic 244 of the PBL 240 arranges the cache 218 such that the cache 218 includes insert logic 272, relocate logic 274, and the processor instructions defining the self-recovery algorithm or SRA in the SRA store 276. The insert logic 272, the relocate logic 274, and the SRA store 276 form a first member 270 of a set of storage devices that share a circuit substrate with the processor 210. Thus, the PBL 240 initializes the computing device 100 by defining the first member 270 of the set of storage devices as a dedicated memory for static data.

The insert logic 272 includes processor instructions that direct the processor 210 to place the branch or vector logic 282 at a desired address in the IMEM 212. The relocate logic 274 includes processor instructions that direct the processor 210 to store setup logic and a copy of the SRA at a defined address in the IMEM 212. The branch logic 282 and the setup logic and SRA copy 284 form a second member 280 of a set of storage devices that share a circuit substrate with the processor 210.

Otherwise, when the reset logic 244 determines that the ROM 190 is recovering from a watchdog reset condition, the PBL 240 directs the processor 210 to jump to the branch logic 282 previously inserted in the IMEM 212 upon a cold boot of the on-chip system 120. The branch logic 282 includes the location of the setup logic and SRA copy 284 in the IMEM 212. Once the processor 210 completes execution of the setup logic, which restores the on-chip system 120 to its previous operating state, the SRA can be incremented to the next processor instruction for execution by the processor 210. In preferred embodiments, data generated by the SRA is communicated via one or more transport mechanisms such as the USB for offline analysis. Alternatively, the system memory 230, which may be implemented with one or more dual data rate storage circuits and the bus coupling the system memory 230 to the processor 210 may be configured by the setup logic in the IMEM 212 to provide a temporary storage location for data generated by the on-chip system 120.

Figure 3:
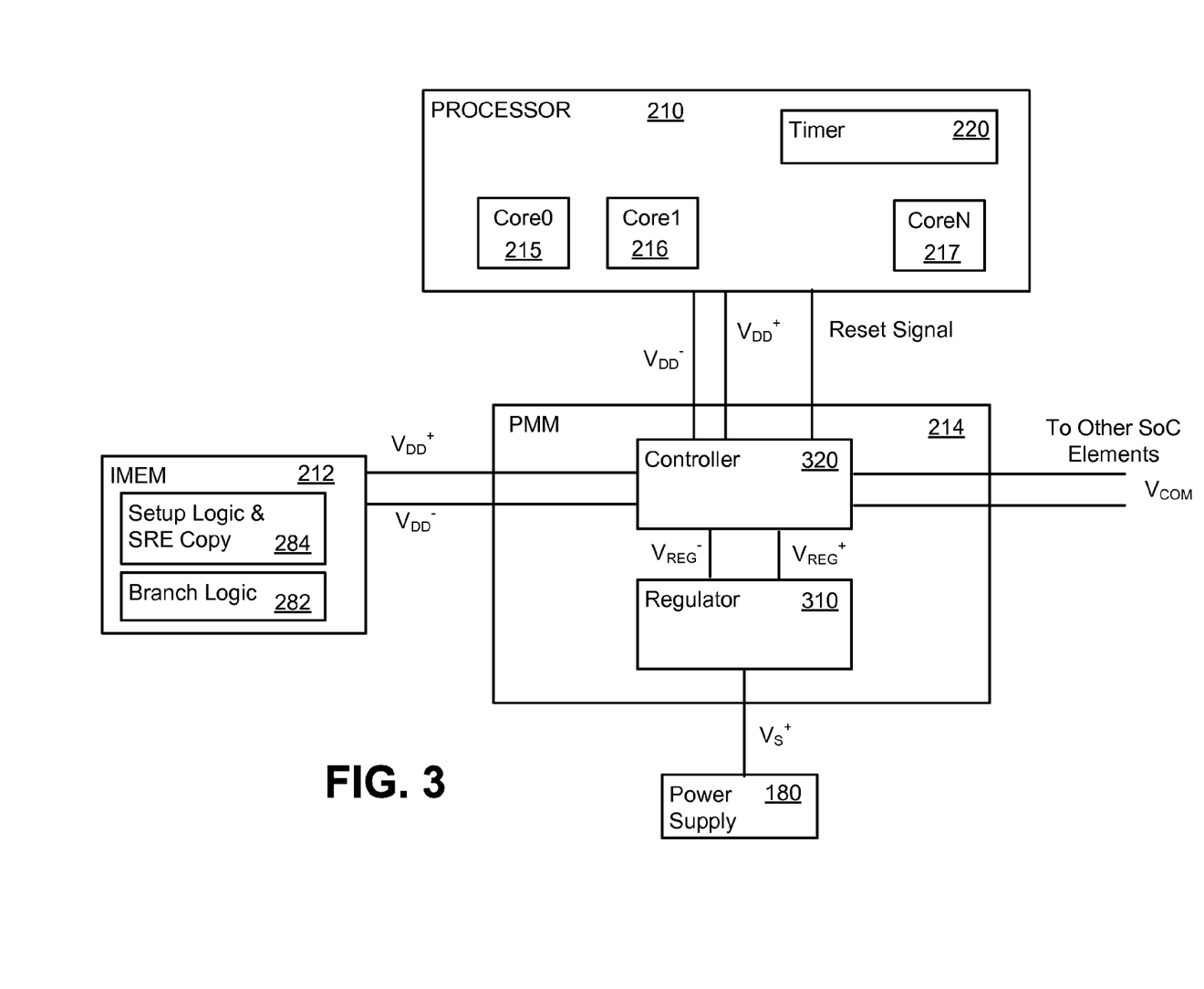
FIG. 3 is a schematic diagram illustrating an example embodiment of the integrated power management module of FIG. 2.

FIG. 3 is a schematic diagram illustrating an example embodiment of the integrated PMM 214 of FIG. 1 and FIG. 2. As indicated in FIG. 3, the integrated PMM 214 is responsive to a watchdog reset signal received from the processor 210 and the supply voltage $V_S^+$ provided by the power supply 180. The PMM 214 includes a regulator 310 and a controller 320. The regulator 310 receives the supply voltage $V_S^+$ from the power supply 180 and generates regulated voltages $V_{REG}^+$ and $V_{REG}^-$, which are provided to the controller 320. In response to the watchdog reset signal, the controller 320 selectively switches conductor 322 and conductor 324 to a common-mode voltage $V_{COM}$ or ground. In alternative embodiments, regulated voltages may be provided by one or more elements external to the on-chip system 120. In these alternative embodiments, the PMM 214 will consist of the controller 320, which receives regulated voltages $V_{REG}^+$ and $V_{REG}^-$ from the external regulator.

As indicated in FIG. 3, the conductor 322 and the conductor 324 are coupled to one or more on-ship system resources other than the processor 210 and the IMEM 212. As further indicated in FIG. 3, the controller 320 maintains power to both the processor 210 and the IMEM 212 during the system or watchdog reset by not removing voltages $V_{DD}^-$ and $V_{DD}^+$ from respective conductors or power rails that provide power to these elements of the on-chip system 120. In the illustrated embodiment, the processor 210 and the IMEM 212 are supplied with the same differential voltages. In other embodiments, one of these devices may be configured to operate using different differential voltage levels from the remaining device. Similarly, one or both devices may be arranged to operate in accordance with one or more single-ended signals provided from an alternatively arranged PMM 214.

Figure 4:
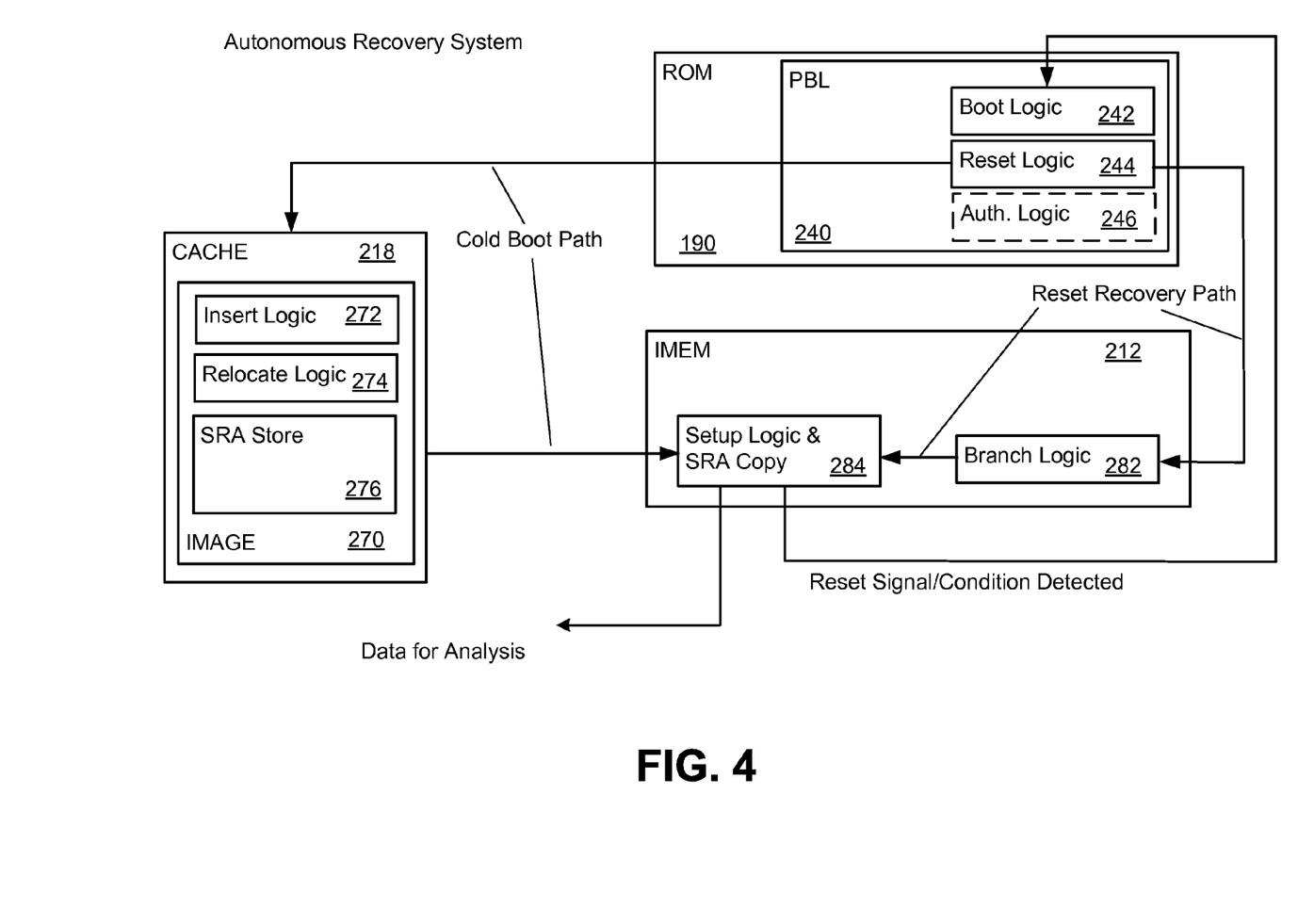
FIG. 4 is a schematic diagram illustrating interaction of the various logic elements introduced in FIG. 2.

FIG. 4 is a schematic diagram illustrating interaction of the various logic elements introduced in FIG. 2. When power is first applied to the elements supporting the autonomus recovery system, e.g., from a cold boot of the on-chip system 120, the PBL 240 of the ROM 190 uses the boot logic 242 to initialize the processor 210 and configure the cache 218 as a tightly-coupled memory element. Thereafter, the boot logic 242 loads an image including the SRA into the SRA Store 276, as well as relocate logic 274 and insert logic 272 into the cache 218.

When the ROM 190 is recovering from a cold boot, the PBL 240 also forwards insert logic 272 and relocate logic 274 to the cache 218. As described, the insert logic 272, when executed by the processor 210, places branch logic 282 at a desired location in the IMEM 212. The branch logic 282 defines the location of a second location in the IMEM 212. Similarly, the relocate logic 274, when executed by the processor 210, places a copy of the setup logic and the SRA at the second desired location in the IMEM 212. In this way, the PBL 240 of the ROM 190, the IMEM 212 and the cache 218 combine to prepare a reset recovery path that enables continuing execution of the SRA absent external intervention.

When one or more of the GPIO bus 211 or information provided by a set of one or more eFuse elements 192 direct the PBL 240 to authenticate the source of the SRA instructions, the PBL 240 uses the optional authentication logic 246 to exercise one or more mechanisms for verifying the source and content of the SRA instructions. This can be accomplished as the instructions are being communicated to the cache 218 or after the processor instructions are stored in the cache 218.

Thereafter, the reset logic 244 either transfers execution to the instructions and logic forwarded to the cache 218 or in the case of a watchdog reset condition directs execution control to the branch logic 282 in the IMEM 212, as indicated by the first branch of the reset recovery path. The branch logic 282 in turn identifies and transfers execution control to the processor instructions that were previously copied to the IMEM 212 and stored at addressable location 284. The setup logic located in the IMEM 212 at addressable location 284 includes instructions that reset the timer used to identify failure conditions in the on-chip system 120. As described, the processor 210 executes the processor instructions copied to the IMEM 212 and forwards data to one or more external storage locations for offline analysis until it encounters a watchdog reset signal condition or has completed a sweep of all desired parameters that are to be tested through execution of the processor instructions in the SRA.

Figure 5:
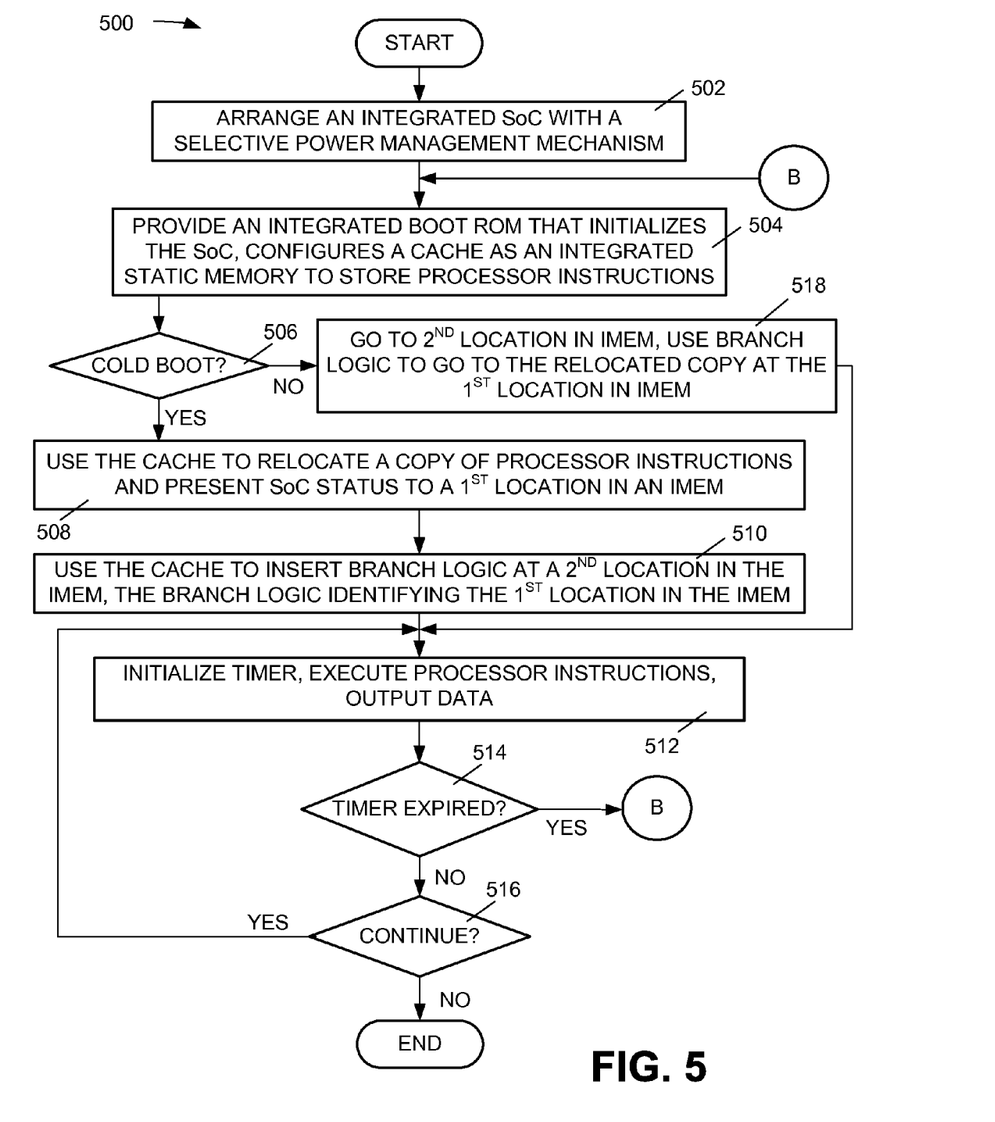
FIG. 5 is a flow diagram of an example embodiment of a method for autonomous recovery of system failures in a computing device with limited data storage resources.

FIG. 5 is a flow diagram of an example embodiment of a method 500 for autonomous recovery of system failures in a computing device with limited data storage resources. The method 500 begins with block 502 where an integrated SoC is arranged with a selective power management module or mechanism, such as the PMM 214, for maintaining power at a processor 210 and at least one memory element such as the IMEM 212 coupled to the processor 210. In block 504, an integrated boot ROM is provided. The integrated boot ROM is a circuit element that initializes the SoC, arranges a cache 218 as an integrated static memory (e.g., a tightly-coupled memory) for storing processor instructions. The integrated boot ROM includes logic that determines when the SoC has been powered from a cold boot as indicated in decision block 506. When a cold boot is detected, the method 500 continues with block 508, where the cache 218 is used as a source for instructions that direct the processor 210 to relocate a copy of processor instructions (e.g., the SRA) and a present SoC status to a first addressable location 284 in an IMEM 212. In block 510, the cache 218 is used as a source for instructions that direct the processor 210 to insert branch or vector logic at a second addressable location 282 in the IMEM 212.

As described, the branch or vector logic stored at the second addressable location 282 identifies the first addressable location 284 where the setup logic and copy of the SRA reside in the IMEM 212. In block 512, execution control is transferred to the processor instructions located at the first addressable location 284 in the IMEM 212. As indicated in block 512, the timer is initialized or reset, the processor instructions are executed, and generated data is transferred to an external storage device. In decision block 514, a determination is made whether the timer has expired. When the response to the determination is negative, such as when the SoC continues to function nominally and additional instructions or configuration steps remain, processing continues by repeating the functions in block 512, block 514, and block 516. Otherwise, when a watchdog reset condition (i.e., a system failure) is indicated, as shown by the flow control arrow labeled "Yes," exiting decision block 514, the method 500 returns to the functions indicated in block 504 where the integrated boot ROM, which remains powered due to the selective power management mechanism, is used to recover from the failure. However, when the SoC is recovering from a watchdog reset, as opposed to a cold boot, the method 500 continues with block 518, where the PBL in the integrated boot ROM is arranged to execute the branch logic at the second location in the IMEM 212. As indicated, the branch logic 282 transfers execution to the setup logic and copy of the SRA previously stored at the first location in the IMEM 212 before repeating the functions of block 512, block 514, and block 516, until exhausting the processor instructions in the SRA, as indicated by the arrow labeled "No," exiting decision block 516, upon which the method terminates.

In some embodiments, the SRA includes instructions for characterizing the operation of the SoC over a broad range of configurable conditions. These configurable conditions may include one or more of clock frequency, supply voltages, computing device loads, as well as one or more environmental conditions. Thus, the present system and methods aggregate results for various supply voltages, clock frequencies and environmental conditions independent of an external computing system. Moreover, the present system and methods execute and recover from system failures autonomously.

In a preferred embodiment, the SRA includes logic for forwarding results to an external data store via the USB controller 140 or the SIM card interface 146. In alternative embodiments, the SRA may include instructions for temporarily storing data in a system memory 230 coupled to the processor 210.

Figure 6:
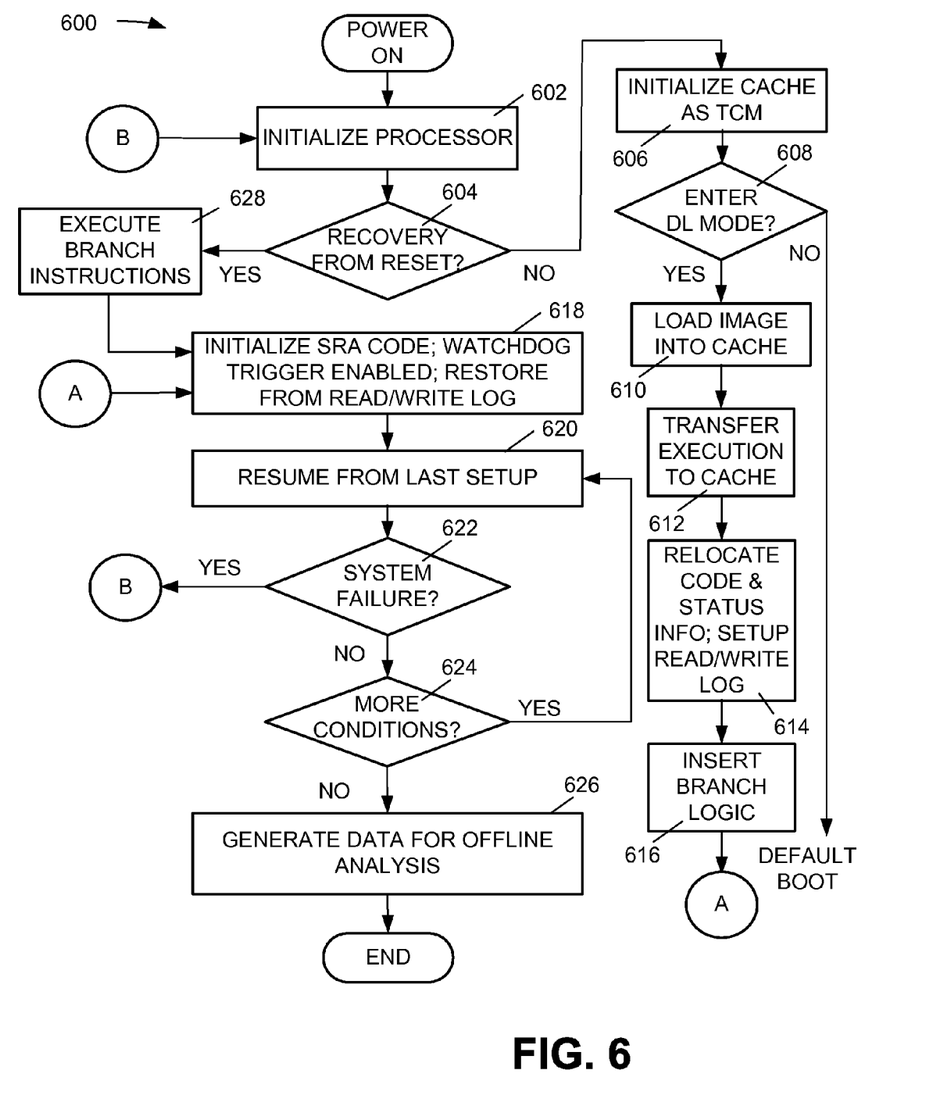
FIG. 6 is a flow diagram of an example embodiment of a method for autonomous recovery from a failure condition.

FIG. 6 is a flow diagram of an example embodiment of a method 600 for autonomous recovery from a failure condition in a SoC. Upon an initial power on or cold boot, a processor is initialized as indicated in block 602. In decision block 604 a determination is made as to whether the SoC is recovering from a watchdog reset signal. When the SoC is powering up from a cold boot, as indicated by the flow control arrow labeled "No," exiting decision block 604, processing continues with block 606, where a cache is configured as a tightly-coupled memory. Thereafter, one or more signals are used to determine whether the SoC should enter a download mode of operation as indicated in decision block 608. When it is the case that the one or more signals do not indicate or direct the SoC to enter the download mode, as indicated by the flow control arrow labeled "No," exiting decision block 608, the SoC performs a default boot.

Otherwise, as indicated by the flow control arrow labeled "Yes," exiting decision block 608 processing continues with block 610 where an image containing an initial setup and a set of processor instructions that define a SRA are loaded into the cache 218. Thereafter, as indicated in block 612, the processor is directed to use the processor instructions from the cache 218. In a preferred embodiment, the functions associated with block 602 through block 612 are performed by a circuit or circuits provided in a read-only memory element such as ROM 190.

In block 614, the cache 218 contains processor instructions that when executed by the processor 210 direct the relocation of code and status information to a first location in an IMEM 212. In addition, the cache 218 contains processor instructions that when executed by the processor 210 direct the configuration of one or more logs for storing data, as further indicated in block 614. Furthermore, the cache 218 contains processor instructions that when executed by the processor 210 direct the insertion of branch logic into a second location within the IMEM 212. In a preferred embodiment, the functions associated with block 614, block 616 and connector A are performed as directed by processor instructions inserted into the cache 218 when the cache 218 is arranged to function as a tightly-coupled memory element.

Thereafter, as indicated by connector A, the SoC initializes the SRA code, enables a watchdog timer trigger or reset, and restores information from the log or logs, as indicated in block 618. In block 620, the SoC is directed to resume from the last setup. If the SRA includes a system characterization routine, the SoC may be directed to retain the present SoC configuration and resume execution of the next processor instruction in the SRA. In decision block 622, a determination is made whether the SoC has failed. When it is the case that the SoC has hung or otherwise failed, processing returns to block 602. However, instead of following a cold boot branch when exiting decision block 604, processing continues with block 628 where branch instructions inserted in the IMEM 212 are used to identify the addressable location where the SRA copy and logs are stored in the IMEM 212, this alternative recovery path or branch is followed to autonomously recover from a SoC reset (e.g., a watchdog timer reset).

As indicated in FIG. 6, processing continues with the functions associated with block 618, block 620, decision block 622 and decision block 624 as long as there are additional sweep parameters or conditions to explore. When no additional conditions remain, processing continues with block 626 where data is aggregated and transferred for offline analysis. As described, the functions associated with block 618 through block 628 are performed in accordance with data and code stored in addressable locations within the IMEM 212.

One or both of the GPIO bus 211 or information recorded in the one or more eFuse element(s) 192 may be used to direct the PBL 240 of the ROM 190 to configure the SoC to operate in a download mode. Moreover, one or more of these or other signals may direct the PBL 240 to respond to an error loading an image including code and data from a flash-based storage media integrated with the SoC.

An additional signal communicated over the GPIO bus 211 or via the eFuse element(s) 192 can be used to direct the PBL to execute authentication logic that authenticates the source and or validity of the SRA or data to be loaded into the cache 218.

While the ROM 190 and its PBL 240 are preferably enabled in a circuit, the logic represented therein may be stored on a non-transitory computer readable medium and available for transport or for making copies as may be desired. In addition, data and/or processor instructions, preferably stored on a computer-readable medium for transport via a download mode of operation onto the SoC for storage in the cache 218 and the IMEM 212 are also available for transport or for making copies as may be desired.

As described, the one or more non-transitory processor or computer-readable medium or media may have stored thereon processor instructions that when executed direct the processor 210 to configure a computing device responsive to one of a download mode of operation that receives processor executable logic from a source other than the computing device or an attempt to record parameters responsive to at least one variable test condition that resulted in an indication of a failure recorded on the computing device.

As also described, the one or more non-transitory processor or computer-readable medium or media may have stored thereon processor instructions that when executed direct the processor 210 to execute processor instructions from a source other than the computing device.

Furthermore, the one or more non-transitory processor or computer-readable medium or media may have stored thereon processor instructions that when executed direct the processor 210 to identify a failure condition and upon recovering from the failure condition, restore the processor executable logic and a present state of the SoC when the failure occurred and after restoring the SoC directing the processor 210 to execute a next processor instruction from the processor instructions.

As further described, the one or more non-transitory processor or computer-readable media may include processor instructions for dedicating a portion of a cache as a tightly-coupled memory element for the storage of static data; processor instructions responsive to one or more input signals received from a GPIO bus 211 or a programmable eFuse element 192 may be used to identify a download mode, an optional authentication mode and a default boot mode.

As also described, the one or more non-transitory processor or computer-readable media may include processor instructions responsive to one or more input signals received from a GPIO bus 211 or a programmable eFuse element 192 that identify the download mode in response to an error loading an image from a flash-based storage media on or off the SoC, an optional authentication mode and a default boot mode. rom a source other than the computing device.

Certain steps in the processes or process flows described in this specification naturally precede others for the invention to function as described. However, the present system and methods are not limited to the order of the steps described if such order or sequence does not alter the functionality of the above-described systems and methods. That is, it is recognized that some steps may be performed before, after, or in parallel (substantially simultaneously) with other steps. In some instances, certain steps may be omitted or not performed without departing from the above-described systems and methods. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated examples in this specification. Therefore, disclosure of a particular set of program code instructions or detailed hardware devices is not considered necessary for an adequate understanding of how to make and use the systems and methods. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may comprise RAM, ROM, EEPROM, Flash, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems and methods, as defined by the following claims.

What is claimed is:

1. A computing device, comprising:
   a primary boot loader responsive to at least two separate start conditions;
   a processor, coupled to and responsive to the primary boot loader;
   a set of storage devices coupled to the processor, a first member of the set of storage devices exhibited in a cache, and a second member of the set of storage devices exhibited in integrated circuits that share a circuit substrate with the processor; and
   an integrated power management module that selectively responds to a computing device condition defining a system fault, wherein the integrated power management module maintains power rails that supply at least the processor and the second member of the set of storage devices when a watchdog reset signal is detected.

2. The computing device of claim 1, wherein the primary boot loader initializes the computing device by defining the first member of the set of storage devices as a dedicated memory for static data.

3. The computing device of claim 1, wherein the primary boot loader initializes the computing device in a download mode in response to an error loading an image from a flash-based storage media.

4. The computing device of claim 1, wherein the primary boot loader is responsive to an input that defines a download mode.

5. The computing device of claim 4, wherein the input that defines the download mode is communicated via an eFuse element or a general-purpose input output bus.

6. The computing device of claim 4, wherein when the download mode is enabled and in response to a separate signal, the primary boot loader authenticates processor executable logic.

7. The computing device of claim 4, wherein when the input that defines the download mode is present, the primary boot loader loads processor executable logic into the first member of the set of storage devices and directs the processor to process the processor executable logic.

8. The computing device of claim 7, wherein the processor executable logic directs the processor to store the processor executable logic and a present device status to a first defined location in the second member of the set of storage devices, the processor executable logic further directing the processor to insert logic at a second defined location in the second member of the set of storage devices that can be accessed in response to a device reset.

9. The computing device of claim 8, wherein the second defined location includes an address of the copy of the processor executable logic and the copy of the present device status.

10. A method for autonomous recovery from system failures in a computing device with restricted capacity data storage resources, the method comprising:
   arranging an integrated circuit with a selective power management module;
   providing integrated read-only logic arranged to initialize the computing device, the integrated read-only logic defining a cache storage element to function as an integrated memory element to store static information including executable logic received from an external source and a present device status;
   using the cache storage element to relocate a copy of the executable logic and the present device status to a first location in an internal memory element;
   using the cache storage element to insert information in a second location in the internal memory element, the information including the first location in the internal memory element; and
   using the integrated read-only logic to detect a condition indicative of a failure and direct a processor to use the information in the second location in the internal memory element to jump to the first location in the internal memory element upon recovery from the failure.

11. The method of claim 10, wherein arranging the integrated circuit with the selective power management module includes maintaining supply power to at least one core of the processor and the internal memory element.

12. The method of claim 10, wherein the integrated read-only logic responds in a first way to a first condition and in a second way to a reset condition.

13. The method of claim 10, wherein the integrated read-only logic authenticates a source of the executable logic.

14. The method of claim 10, wherein the executable logic is arranged to characterize the computing device and store results in the second location in the internal memory element.

15. The method of claim 14, wherein the executable logic records results for varying supply voltage and environmental conditions independent of an external computing system.

16. A non-transitory processor-readable medium having stored thereon processor instructions that when executed direct the processor to perform functions, comprising:
   configuring a computing device responsive to one of a download mode of operation that receives processor executable logic from a source other than the computing device or an attempt to record parameters responsive to at least one variable test condition that resulted in an indication of a failure recorded on the computing device;
   executing the processor executable logic from the source other than the computing device;
   identifying a failure condition;
   upon recovering from the failure condition, restoring the processor executable logic and a state of the computing device when the failure condition is indicated; and
   executing the next instruction from the processor executable logic.

17. The non-transitory processor-readable medium of claim 16, wherein configuring the computing device includes dedicating a portion of a cache for storage of static data.

18. The non-transitory processor-readable medium of claim 16, wherein configuring the computing device is responsive to an input received via a general-purpose input output bus or an eFuse.

19. The non-transitory processor-readable medium of claim 16, wherein configuring the computing device includes enabling a download mode in response to an error loading an image from a flash-based storage media.

* * * * *